United States Patent [19]
Fraenkel et al.

[11] Patent Number: 5,940,395
[45] Date of Patent: Aug. 17, 1999

[54] METHOD AND SYSTEM FOR INFORMATION PLUG-INS FOR CONFIGURABLE CLIENT-SERVER APPLICATIONS

[75] Inventors: Michael L. Fraenkel, Raleigh; Binh Q. Nguyen; Richard J. Redpath, both of Cary; Sandeep K. Singhal, Raleigh, all of N.C.

[73] Assignee: International Business Machines Corp., Armonk, N.Y.

[21] Appl. No.: 08/770,607

[22] Filed: Dec. 19, 1996

[51] Int. Cl.$^6$ .......................................... H04J 3/02
[52] U.S. Cl. ........................ 370/401; 370/254; 370/389
[58] Field of Search .................................. 370/254, 389, 370/401, 402, 404

[56] References Cited

U.S. PATENT DOCUMENTS

| | | | |
|---|---|---|---|
| 5,475,817 | 12/1995 | Waldo et al. | 395/650 |
| 5,579,309 | 11/1996 | Totzke | 370/385 |
| 5,602,840 | 2/1997 | Gunther et al. | 370/385 |
| 5,619,500 | 4/1997 | Hiekali | 370/401 |
| 5,644,571 | 7/1997 | Seaman | 370/401 |
| 5,727,203 | 3/1998 | Hapner et al. | 395/614 |
| 5,734,654 | 3/1998 | Shirai et al. | 370/401 |
| 5,742,772 | 4/1998 | Sreena | 370/401 |
| 5,848,246 | 12/1998 | Gish | 395/200.58 |

*Primary Examiner*—Chi H. Pham
*Assistant Examiner*—Frank Duong
*Attorney, Agent, or Firm*—A. Bruce Clay

[57] ABSTRACT

A software communication system is configured with a base connection point with a plug-in type architecture. A plurality of classes is used that implements a specified interface, the interface including a method for receiving packet data. Each one of the plurality of classes is assigned to a component identifier. The plurality of classes are registered using a corresponding component identifier, and information in a packet is used to select an appropriate one of the classes to receive the packet data.

18 Claims, 4 Drawing Sheets

METHOD AND SYSTEM FOR INFORMATION PLUG-INS FOR CONFIGURABLE CLIENT-SERVER APPLICATIONS

FIELD OF THE INVENTION

This invention relates in general to computer software, and in particular to a method and system for information plug-in components for configurable client-server applications.

BACKGROUND OF THE INVENTION

Server systems for data processing in a network interface commonly receive and disseminate information from and to connected users. Commercial multi-user platforms rely on server communication, which is customized to particular media streams for scalability. One alternative solution is licensing of a particular server source code for modification to a particular application. This solution is not optimal and is expensive as it requires experienced personnel to make modifications. Clearly, server systems need to be configurable and scalable within a realistic model for multi-user connectivity.

Therefore, a need exists for a method and system of providing a configurable and scalable server which can support a large number of users, support a multitude of media streams, reduce latency where possible, and avoid restrictions to scalability.

SUMMARY OF THE INVENTION

One object of the present invention is to provide a method for a configurable, scalable, multi-user communications system. Another object of the invention is to provide an architectural base connection point for de-multiplexing various types of media data.

In accordance with one aspect of the present invention, a method of configuring a software communication system with a base connection point with a plug-in type architecture is provided. A plurality of classes are used that implement a specified interface, the interface including a method for receiving packet data. Each of the classes are assigned to a component identifier. The classes are registered using corresponding component identifiers, and information in a packet is used to select an appropriate one of the classes to receive the packet data.

BRIEF DESCRIPTION OF THE DRAWINGS

For a more complete understanding of the present invention and for further advantages thereof, reference is now made to the following Detailed Description taken in conjunction with the accompanying drawings, in which.

DETAILED DESCRIPTION OF THE INVENTION

Figure 1:
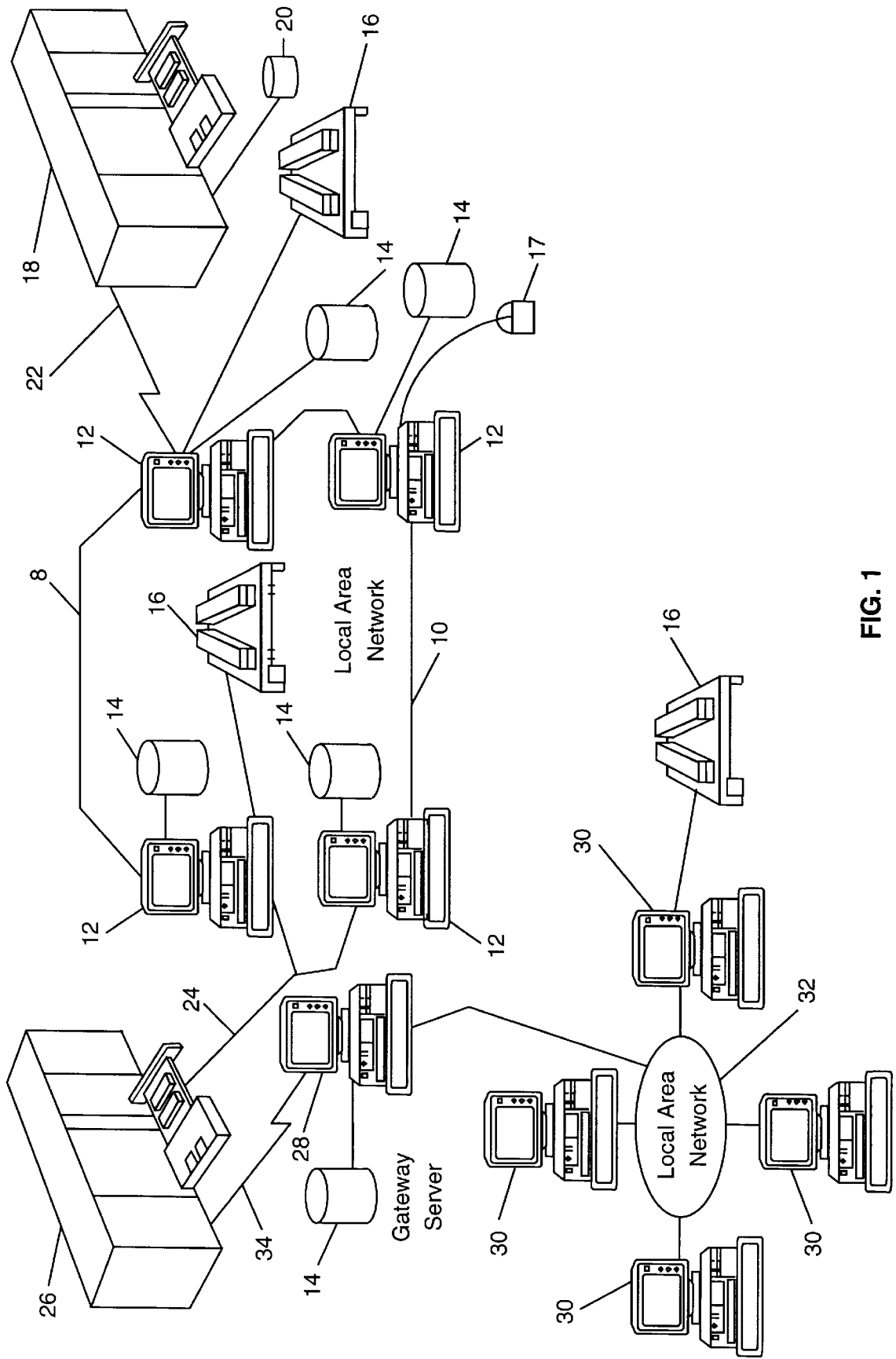
FIG. 1 is a pictorial representation of a data processing system which may be utilized to implement a method and system of the present invention.

Referring to FIG. 1, there is depicted a graphical representation of a data processing system 8, which may be utilized to implement the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network. Each said network may also consist of a plurality of processors coupled via a communications medium, such as shared memory, shared storage, or an interconnection network. As is common in such data processing systems, each individual computer may be coupled to a storage device 14 and/or a printer/output device 16 and may be provided with a pointing device such as a mouse 17.

The data processing system 8 may also include multiple mainframe computers, such as mainframe computer 18, which may be preferably coupled to LAN 10 by means of communications link 22. The mainframe computer 18 may also be coupled to a storage device 20 which may serve as remote storage for LAN 10. Similarly, LAN 10 may be coupled via communications link 24 through a sub-system control unit/communications controller 26 and communications link 34 to a gateway server 28. The gateway server 28 is preferably an IWS which serves to link LAN 32 to LAN 10.

With respect to LAN 32 and LAN 10, a plurality of documents or resource objects may be stored within storage device 20 and controlled by mainframe computer 18, as resource manager or library service for the resource objects thus stored. Of course, those skilled in the art will appreciate that mainframe computer 18 may be located a great geographic distance from LAN 10 and similarly, LAN 10 may be located a substantial distance from LAN 32. For example, LAN 32 may be located in California while LAN 10 may be located within North Carolina and mainframe computer 18 may be located in New York.

Software program code which employs the present invention is typically stored in the memory of a storage device 14 of a stand alone workstation or LAN server from which a developer may access the code for distribution purposes, the software program code may be embodied on any of a variety of known media for use with a data processing system such as a diskette or CD-ROM or may be distributed to users from a memory of one computer system over a network of some type to other computer systems for use by users of such other systems. Such techniques and methods for embodying software code on media and/or distributing software code are well-known and will not be further discussed herein.

Most commercial multi-user servers license a particular server source code with an API for a particular operation or contract modification to fit an application. Thus, there is a need for a method and system for providing a scalable server, which can be configurable to current paradigms and unforseen paradigms. The solution herein provides a client side and a server side application base connection point for de-multiplexing various types of real-time media data (audio, video, motion, text, etc.). The various media data handlers are the software components of concern. Applications select the media streams (components) to use and integrate the incoming information for the user.

The client connection point receives data packets from the server or from other clients. The packets share a common header which identifies the sender, the transmission time, and other common information. The header also includes the component type number (ID). The software designer allocates ID numbers for each of the known or projected software components (e.g., audio, video, text, etc.). It is important to note that not all of these components need to be actually installed at any one time during the application's execution. The client connection point uses the component ID number in the packet header to de-multiplex the packet data to the corresponding component (if installed); if no matching component is installed, the packet is discarded.

To support unanticipated component types, one component ID number is reserved for "application-specific" components. Components installed with this ID number must also designate a string name. The client infrastructure can, therefore, de-multiplex those packets which contain this ID number along with the string identifier.

The client connection point exposes an API, by which the running application can install or remove plug-in components by specifying an ID number (and string identifier, if required), and/or an object reference that exposes a simple packet delivery interface. Alternatively, the application may specify a class whose instances expose the packet delivery interface; in this case, the base connection point is responsible for creating an instance(s) of the given class on an as-needed basis. Because the development documentation describes the packet data payload for each media type, independently developed component implementations can also read and produce the same data packets as the original component implementation, and can therefore serve as replacements for the component implementations provided by the original developer. If all hosts install a new component implementation for a particular component ID number, then that implementation can define its own packet payload format.

In use, therefore, the running Java application can select the particular media of interest, and it only need load and install those components required for supporting the desired media types. The application can also access a Web server or other data repository, see a directory of available media, select a component, download the set of classes, and register the component with the base connection point. The application can also download a new implementation of a pre-defined component and install it as a replacement for the version supplied by the original developer and available locally.

In a real-world example, a game might need a way to handle real-time information about new bullets fired by tanks. It can define a component with component ID "application-specific" and a string name "bullet." That component can be installed, and it will receive all bullet updates generated by other clients in the system.

The server functionality can be customized in much the same way as the client. The server-side base connection point is similar to the system provided on the client, except that the server also provides a "pass-through" component implementation. The pass-through implementation can be installed when the server application desires to simply enable the exchange of a particular media type (as identified by a component ID number and optional string identifier) without doing any further processing on that data.

Figure 2:
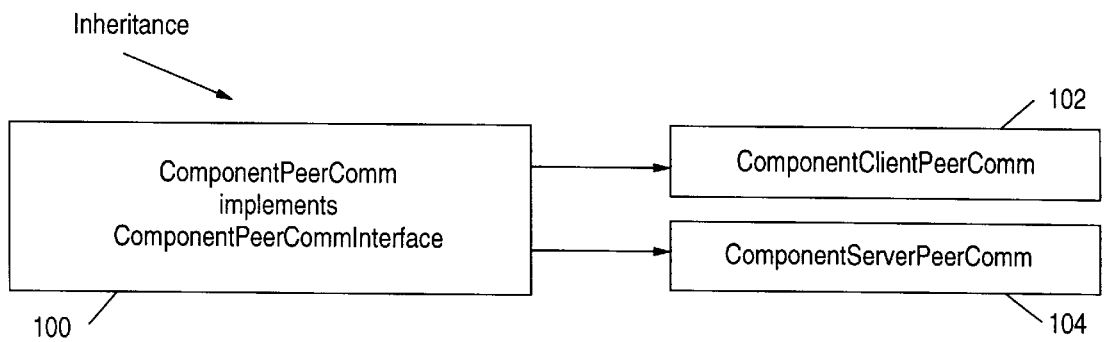
FIG. 2 is a flowchart illustrating inheritance in accordance with the present invention.
Figure 5:
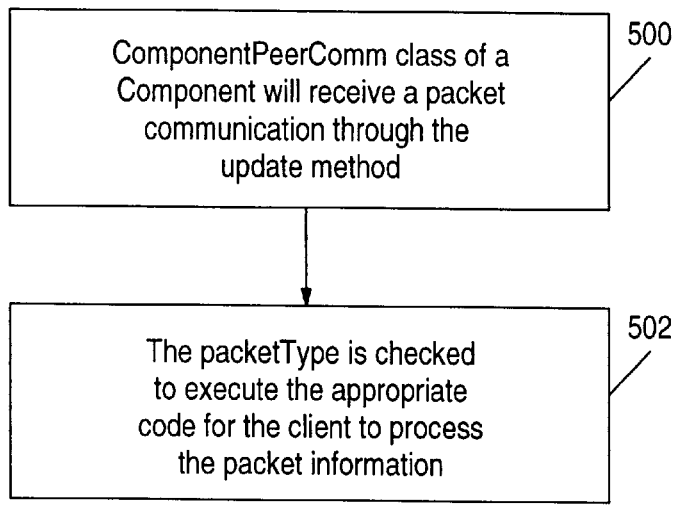
FIG. 5 is a flowchart illustrating a client application receiving communication.

Referring to FIG. 2, each component provides a ComponentPeerComm class that receives data for a particular type of media. The ComponentPeerComm class is implemented from the ComponentPeerCommInterface in block 100. The ComponentPeerCommInterface defines the update method (see Table 1 below). The ComponentPeerComm will receive packet communication information through the update method. The packetType is optionally checked for further parsing and dispatching information to the appropriate component method (see FIG. 5).

TABLE 1

Definition of ComponentPeerCommInterface ibm.inverse.comm.ComonentPeerCommInterface
package ibm.inverse.comm;
import java.io.DataInputStream;
public interface ComponentPeerCommInterface
{
    abstract void update(Packet              data,
                         DataInputStream     stream,
                         int                 packetType,
                         long                pktTimestamp,
                         String              sourceName);
}

If the component provides separate client-side and server-side functionality, it may provide a client plug-in component in block 102 and a server plug-in component in block 104, which both implement the ComponentPeerCommInterface. They may optionally inherit from a common ComponentPeerComm that provides common services (FIG. 2).

Figure 3:
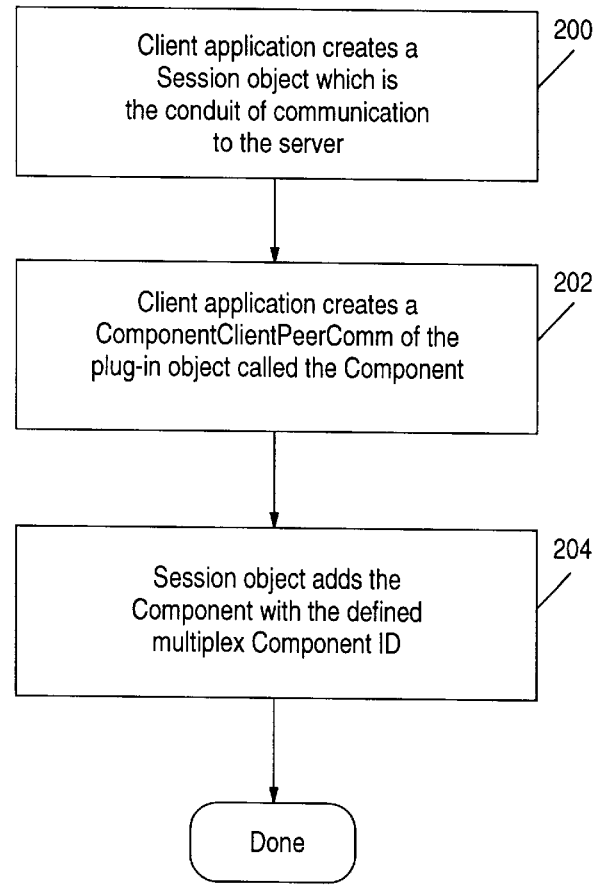
FIG. 3 is a flowchart illustrating the creation of a plug-in component.
Figure 4:
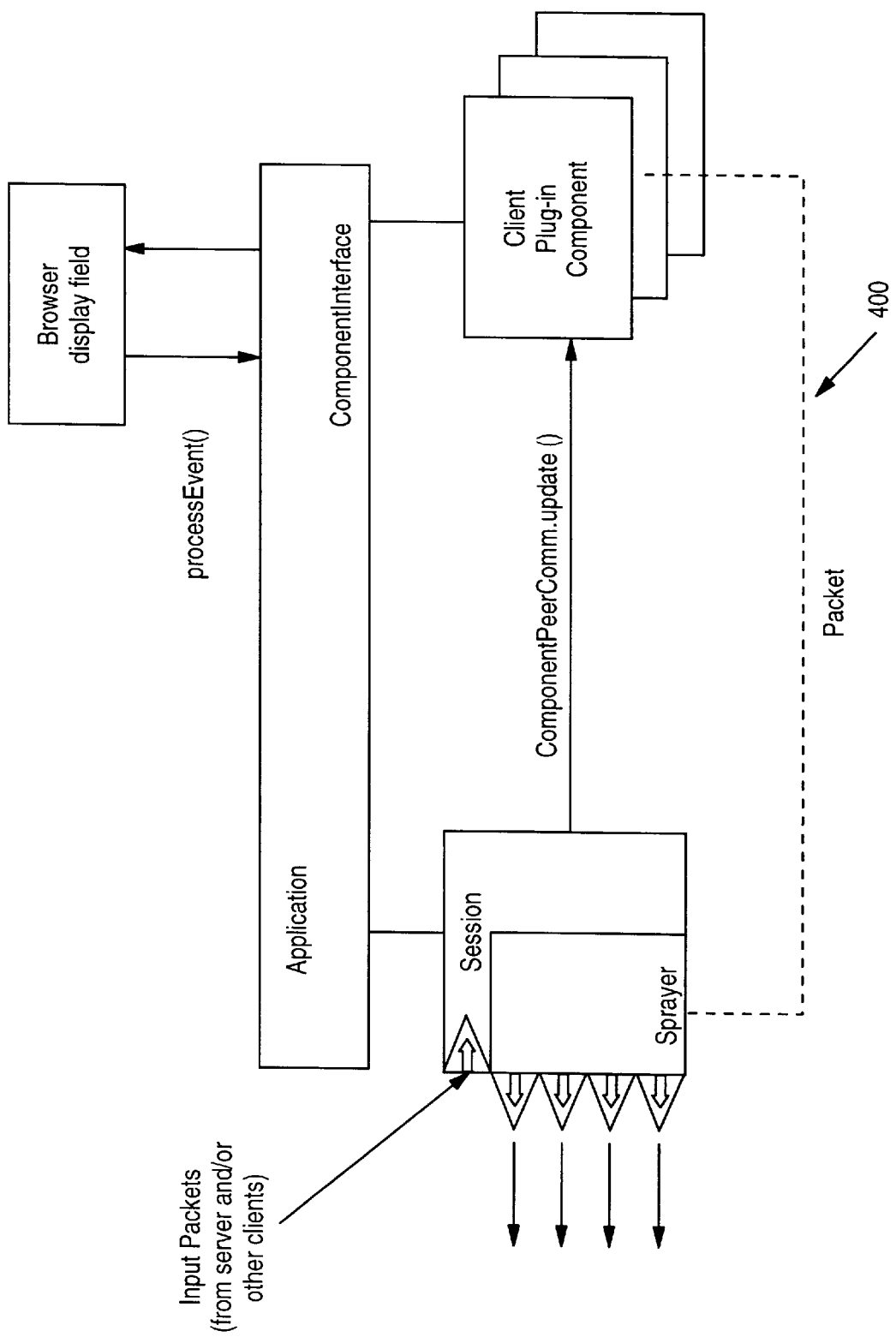
FIG. 4 illustrates a client application with a Session and plug-in components.

Referring to FIG. 3, the client application creates a Session object, which is the conduit of communication to the server in block 200. The client application also creates a ComponentClientPeerComm object in block 202 for receiving and disseminating information. The client application, via the Session object, adds the ComponentClientPeerComm (the plug-in component) in block 204 with the defined multiplex component ID. Once this is performed, the client is included into the server environment for receiving and enabled sending of information of the specified type from and to other clients and the server (see FIG. 4).

The process for the client application receiving communication can be from a server or from another client. At block 500 of FIG. 5, the ComponentPeerComm (or, if that is not implemented, the ComponentClientPeerComm) class of a component will receive a packet communication through the update method. The client executes the appropriate code to process the packet information at block 502, and may check the packetType to select which code is appropriate.

Figure 6:
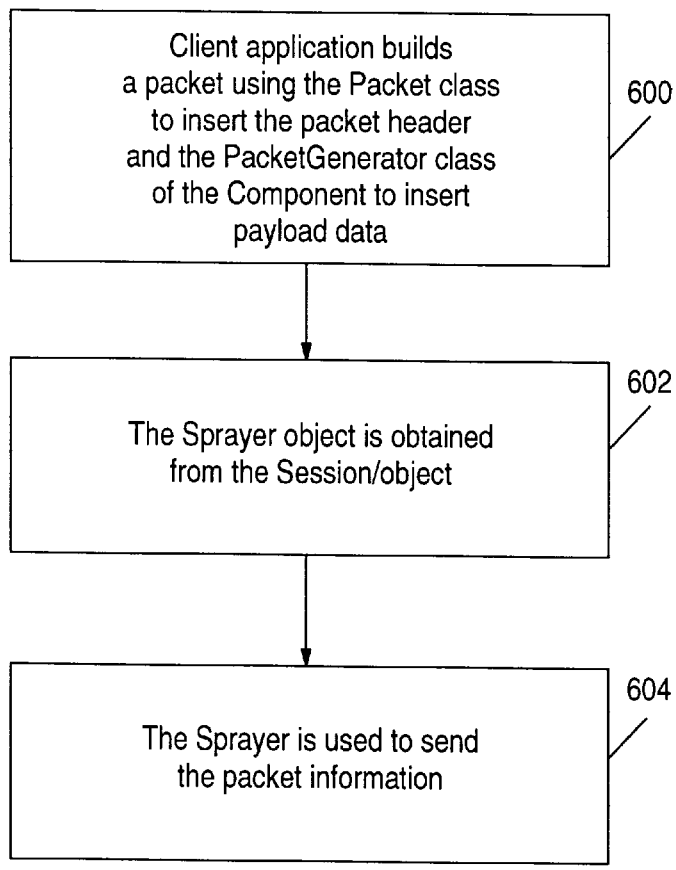
FIG. 6 is a flowchart illustrating a client application sending communication.

Referring to FIG. 6, the client application builds a packet to send information at block 600 by using the Packet class of the system to generate the common packet header format used by all components and by using a component-specific PacketGenerator class to add additional payload data. The Sprayer object is obtained from the Session in block 602 and utilized to send the information to other connected users and/or the server at block 604. The process is transparent to the client application (see FIG. 4, as generally identified by reference numeral 400).

In the preferred embodiment of this invention, each plug-in component defines a Java package (e.g., ibm.inverse.components.textchat). Within this package, the component provides three basic classes: UpdateTypes, PacketGenerator, and ComponentPeerComm. The UpdateType class defines the packetType identifiers used by the component. The PacketGenerator class inserts the packet data payload for sending information as shown in sample code in Table 2 below.

TABLE 2

Sample UpdateTypes and PacketGenerator Classes

```
ibm.inverse.components.textchat.UpdateTypes
package ibm.inverse.components.textchat;
class UpdateTypes{
    public static final int TextchatInformation = 0
}
ibm.inverse.components.textchat.PacketGenerator
package ibm.inverse.components.textchat;
import ibm.inverse.comm.ComponentTypes;
import ibm.inverse.comm.Packet;
import java.io.DataOutputStream;
import java.io.IOException;
public class PacketGenerator{
    public static Packet speak(String universalAvatarName,
                               String data){
    Packet pkt = new Packet(ComponentTypes.Text,
                            UpdateTypes.TextchatInformation,
                            universalAvatarName);
        try{
            pkt.outputStream.writeString(data);
        }catch (Exception e) {}
        return pkt;
    }
}
```

The following example plug-in component, called textchat, is created to allow users to chat amongst each other with text. This type of connectivity is referred to as a chatroom. The ComponentPeerComm class is defined from the ComponentPeerCommInterface (Table 1).

The ComponentPeerComm will receive packet communication information through the update method. The format of the payload information is controlled by the PacketGenerator of Table 2. The packetType is checked for parsing and disseminating the information to the appropriate agent method as shown below in Table 3.

TABLE 3

Sample ComponentPeerComm Class

```
ibm.inverse.components.textchat.ComponentPeerComm
package ibm.inverse.components.textchat;
import ibm.inverse.comm.Packet;
import java.io.DataInputStream;
import java.io.IOException;
abstract public class ComponentPeerComm
    implements ibm.inverse.comm.ComponentPeerCommInterface{
    final public void update(Packet      data,
                             DataInputStream stream,
                             int             packetType,
                             long            pktTimestamp,
                             String          sourceName){
    try{
        switch(packetType){
            case UpdateTypes.TextchatInformation:
                updateInformation (stream.readstring (),
                                   pktTimestamp,
                                   sourceName);
                break;
            default:
                throw new Exception("Illegal update type (Chat)." +
                                    packetType);
        }
    } catch (IOException ioe){
        System.out.println("PeerComm.update (packet parsing): " +
                           ioe.getMessage());
        ioe.printStackTrace();
        System.exit(1);
    }catch (Exception e){
        System.out.println("PeerComm.update (packet processing): " +
                           e.getMessage());
```

TABLE 3-continued

Sample ComponentPeerComm Class

```
        e.printStackTrace();
        System.exit(1);
    }
}
abstract void updateInformation(String information,
                                long    pktTimestamp,
                                String  sourceName);
}
```

From the ComponentPeerComm class, separate client plug-in and server plug-in components may be defined (see FIG. 2). The textchat plug-in only requires a client-side plug-in, and it is unnecessary to supply a server plug-in. Instead, the default "pass-through" plug-in implementation will be used at the server. The ComponentClientPeerComm class is defined in accordance with FIG. 2, and is shown below in Table 4.

TABLE 4

Sample ComponentClientPeerComm Class

```
ibm.inverse.components.textchat.ComponentClientPeerComm
import ibm.inverse.comm.Packet;
import ibm.inverse.control.Session;
public class ComponentClientPeerComm
        extends ComponentPeerComm {
    Session session;
    ChatInterface chat;
public ComponentClientPeerComm(Session s, ChatInterface ci) {
    session = s;
    chat    = ci;
}
void updateInformation(String information,
                       long    pktTimestamp,
                       String  sourceName);
    }
}
```

As a result of the present invention, a base connection point for de-multiplexing various types of media through a plug-in design is provided. Although the present invention has been described with respect to a specific preferred embodiment thereof, various changes and modifications may be suggested to one skilled in the art and it is intended that the present invention encompass such changes and modifications as fall within the scope of the appended claims.

We claim:

1. A method of configuring a software communication system with a base connection point with a plug-in type architecture, comprising the steps of:

providing a plurality of classes that implement a specified interface, said interface including a method for receiving a packet of data;

assigning each one of said plurality of classes to a component identifier;

registering at least one of said plurality of classes corresponding to at least one of said component identifiers with the base connection; and using component identifier information in the packet to route the packet to a registered class corresponding to the component identifier of the packet.

2. The method of claim 1, further comprising:

unregistering a registered one of said plurality of classes from said base connection.

3. The method of claim 1, further comprising:

using a packet type identifier to dispatch said packet data to an appropriate method for processing said packet data.

4. A software communication system with a base connection point having a plug-in type architecture, comprising:

means for using a plurality of classes to expose a packet delivery interface;

means for assigning each of the plurality of classes a respective component identifier;

means for registering said plurality of classes with said base connection point;

means for de-multiplexing incoming packets to registered ones of said plurality of classes using component identifier information in the packets and the component identifiers of registered ones of the plurality of classes; and means for receiving packets through said packet delivery interface.

5. The system of claim 4, further comprising:

means for generating packets with appropriate header information in order to enable said means for de-multiplexing at a receiving host.

6. The system of claim 4, further comprising:

means for discarding packets that are not associated with a registered class.

7. The system of claim 6, further comprising:

means for using at least one of said plurality of classes to expose said packet delivery interface and to perform no action on said incoming data.

8. The system of claim 4, wherein said means for de-multiplexing further comprises:

means for using numeric component identifiers.

9. The system of claim 8, wherein said means for de-multiplexing further comprises:

means for using unique string identifiers.

10. The system of claim 4, further comprising:

means for unregistering at least one of said plurality of classes from said base connection point.

11. A computer program product recorded on computer readable medium for configuring a software communication system with a base connection point with a plug-in type architecture, comprising:

computer readable means for using a plurality of classes that implement a specified interface, said interface including a method for receiving a packet of data;

computer readable means for assigning each one of said plurality of classes to a component identifier;

computer readable means for registering ones of said plurality of classes using corresponding ones of said component identifiers; and computer readable means for using component identifier information in the packet to select an appropriate one of said registered ones of said plurality of classes to receive said packet.

12. The computer program product of claim 11, further comprising:

computer readable means for unregistering at least one of said registered ones of said plurality of classes from said base connection point.

13. The program product of claim 11, further comprising:

computer readable means for using a packet type identifier to dispatch said packet data to an appropriate method for processing said packet data.

14. A method according to claim 1, further comprising the step of discarding the packet if the packet has a component identifier different from a component identifier of a registered class.

15. A method according to claim 1, wherein the component identifier identifies a media type associated with the data of the packet.

16. A plug-in configurable software communication system, comprising:

at least one plug-in software component; and a base connection point which multiplexes and de-multiplexes packets of data to and from installed plug-in software components;

wherein the plug-in software component is configured so as to be installed in and removed from the base connection point, and wherein the plug-in software component has associated with it a component identifier; and wherein the base connection point exposes an application program interface (API) configured to install or remove the plug-in software component and wherein the connection point de-multiplexes packets to the plug-in software component if the plug-in software component is installed based on component identifiers associated with the packets and the component identifier of the installed plug-in software component.

17. A plug-in configurable software communication system according to claim 16, wherein the base connection point comprises:

a class for exposing the API; and means for generating an instance of the class when the plug-in software component is installed and for terminating the instance of the class when the plug-in software component is removed.

18. A plug-in configurable software communication system according to claim 16, wherein the base connection point discards packets having an associated component identifiers which does not correspond to a component identifier of an installed plug-in software component.

* * * * *